(12) United States Patent
Aeschilmann

(10) Patent No.: US 9,718,257 B2
(45) Date of Patent: Aug. 1, 2017

(54) BENDING WOOD LAMINATE AND BENT SHAPED PART PRODUCED THEREFROM

(71) Applicant: Airex AG, Sins (CH)

(72) Inventor: Peter Aeschilmann, Windisch (CH)

(73) Assignee: Airex AG, Sins (CH)

( * ) Notice: Subject to any disclaimer, the term of this patent is extended or adjusted under 35 U.S.C. 154(b) by 0 days.

(21) Appl. No.: 14/767,694

(22) PCT Filed: Feb. 12, 2014

(86) PCT No.: PCT/EP2014/052760
§ 371 (c)(1),
(2) Date: Aug. 13, 2015

(87) PCT Pub. No.: WO2014/124991
PCT Pub. Date: Aug. 21, 2014

(65) Prior Publication Data
US 2015/0367609 A1    Dec. 24, 2015

(30) Foreign Application Priority Data

Feb. 13, 2013  (DE) .................. 10 2013 101 428

(51) Int. Cl.
*B32B 3/28* (2006.01)
*B32B 21/04* (2006.01)
(Continued)

(52) U.S. Cl.
CPC ............. *B32B 21/042* (2013.01); *B27D 1/04* (2013.01); *B27D 1/08* (2013.01); *B32B 1/08* (2013.01);
(Continued)

(58) Field of Classification Search
CPC ... Y10T 428/24471; B32B 3/28; B32B 21/13; B32B 21/14; B32B 21/042; B27D 1/04
(Continued)

(56) References Cited

U.S. PATENT DOCUMENTS 3,437,547 A   4/1969 Sullivan
4,204,900 A   5/1980 Kohn
(Continued)

FOREIGN PATENT DOCUMENTS

CN   101327603 A   12/2008
CN   201214265 Y    4/2009
(Continued)

OTHER PUBLICATIONS

International search report dated May 12, 2014.
Chinese office action for application No. 201480016313.4 dated Jul. 11, 2016.

*Primary Examiner* — Alexander Thomas
(74) *Attorney, Agent, or Firm* — Bachman & LaPointe, PC

(57) ABSTRACT

A pliable bentwood laminate with an intermediate layer (2) forming a central layer, having first and second surface sides, a first outer timber layer (3) on the first surface side, and a second outer timber layer (4) one the second surface side, wherein the distance between the outer surface of the first and second outer timber layers (3, 4) is at least 8 mm, wherein the first and the second outer timber layers (3, 4) are formed from rotary cut balsawood veneer, wherein density of the first and second outer timber layers (3, 4), with a residual moisture content of 12% by weight with respect to the timber mass, is less than 200 kg/m$^3$, wherein the first and second outer timber layers (3, 4) have lathe checks (5) on one surface side, wherein the first and second outer timber layers (3, 4) are arranged with the surface side having the lathe checks (5) faces away from the intermediate layer (2), wherein the bentwood laminate can be and/or is curved with an inner bending radius of between 100 mm and 250 mm, wherein the intermediate layer is a directional timber layer, a natural axis of the bentwood laminate runs in the inter- (Continued)

mediate layer, and wood grain of the directional intermediate layer runs at right-angles to longitudinal extent of the lathe checks (5).

19 Claims, 2 Drawing Sheets

(51) Int. Cl.
| | |
|---|---|
| B27D 1/04 | (2006.01) |
| B27D 1/08 | (2006.01) |
| B32B 5/02 | (2006.01) |
| B32B 7/12 | (2006.01) |
| B32B 15/10 | (2006.01) |
| B32B 21/08 | (2006.01) |
| B32B 21/10 | (2006.01) |
| B32B 21/14 | (2006.01) |
| B32B 1/08 | (2006.01) |
| B27N 5/00 | (2006.01) |

(52) U.S. Cl.
CPC ............... *B32B 3/28* (2013.01); *B32B 5/024* (2013.01); *B32B 7/12* (2013.01); *B32B 15/10* (2013.01); *B32B 21/08* (2013.01); *B32B 21/10* (2013.01); *B32B 21/14* (2013.01); *B27N 5/00* (2013.01); *B32B 2307/304* (2013.01); *B32B 2479/00* (2013.01); *Y10T 428/24066* (2015.01); *Y10T 428/24471* (2015.01)

(58) Field of Classification Search
USPC ........................................................ 428/106
See application file for complete search history.

(56) References Cited

U.S. PATENT DOCUMENTS

| 4,461,666 A | 7/1984 | Kohn |
|---|---|---|
| 2008/0152862 A1 | 6/2008 | Idestrup |

FOREIGN PATENT DOCUMENTS

| DE | 1528097 | 8/1970 |
|---|---|---|
| DE | 20108858 | 8/2001 |
| EP | 0 119 540 | 9/1984 |
| GB | 572267 | 10/1945 |
| GB | 797026 | 6/1958 |
| JP | 07205353 A | 8/1995 |
| WO | 03/103909 | 12/2003 |
| WO | 2009/138197 | 11/2009 |
| WO | 2011/096886 | 8/2011 |

BENDING WOOD LAMINATE AND BENT SHAPED PART PRODUCED THEREFROM

BACKGROUND OF THE INVENTION

The invention concerns a pliable bentwood laminate (i.e. after processing curved into a moulding), with an intermediate layer, in particular forming a central layer, having a first and a second surface side (facing away from one another), wherein a first timber layer is provided, in particular is bonded with adhesive onto the first surface side, and a second timber layer is provided, in particular is bonded with adhesive onto the second surface side. Furthermore the invention concerns a curved moulding manufactured from such a bentwood laminate, wherein the bentwood laminate of the curved moulding is no longer pliable in its processed form, but rather is stiffened, in particular by virtue of the provision of at least one covering layer.

WO 2009/138197 A1, which is outside the subject area, is concerned with mouldings of balsawood that are stiff in bending, wherein as an intermediate step in the manufacture of such a moulding it is of known art to manufacture a block that is stiff in bending from a multiplicity of veneers arranged one above another, and to process this into cross-cut timber sheets.

From DE 201 08 858 U1 a furniture manufacture panel that is stiff in bending is of known art; as an intermediate or core layer this has what is, in comparison to the other layers, a very thick balsawood sheet, the fibres of which are aligned at right angles to the surface area of the panel, as a result of which a stiff lightweight construction panel for land vehicles and aircraft is obtained. The above-cited balsawood intermediate layer takes the form of solid timber, on whose outer faces timber veneer layers can be provided for purposes of decoration.

EP 2 119 540 A1, which is also outside the subject area, is concerned with rigid mouldings of balsawood timbers, wherein the moulding is formed from a multiplicity of small balsawood sections, which are bonded by means of adhesive located between them. The moulding of known art is not pliable.

From GB 797 026 a two-layer balsawood structure for the manufacture of liquefied gas tanks is of known art. Two layers of solid balsawood are deployed, whose fibre directions are orientated at right angles to one another. With the two-layer arrangement of known art only very large bending radii can be manufactured, such as occur in liquefied gas tanks.

In addition to the above-cited balsawood applications, bentwoods, traditionally designated as bendable plywood, are well known. The bentwoods of known art are often used as central layer structures of curved mouldings, wherein for many applications, e.g. in furniture construction, it is necessary to bond together with adhesive a multiplicity of bendable plywood timbers, in each case multi-layer, and initially separate from one another, so as to achieve a sufficient wall thickness; however, this is disadvantageous in many respects. On the one hand, the manufacturing process for the resulting curved moulding is more complex, since many operational steps are necessary. On the other hand the direct bonding with adhesive of bendable plywood timbers leads in practice, without a barrier between the bendable plywood timbers, to a joint with a comparatively low stiffness.

Furthermore, the minimum bending radii that can be achieved with the bendable plywood timbers of known art are set within comparatively tight limits, so that when implementing these small bending radii the result would be damage of the bentwood, or, if necessary, a plurality of very thin plywood layers would have to be deployed.

Also, in the case of existing timbers, in particular with a comparatively large thickness, the large restoring forces acting during the bending process are disadvantageous, since they render any further processing into curved mouldings more difficult.

SUMMARY OF THE INVENTION

Based on the above-cited prior art, the object underlying the invention is that of specifying a bentwood laminate (bentwood), which, on the one hand, is distinguished by the fact that it can be manufactured in a simple manner in larger thicknesses than is the case for bendable plywood timbers of known art, and moreover by the fact that very small bending radii can be achieved without the risk of damage. Here the processability should be as simple as possible. Furthermore the object consists of specifying a moulding manufactured from such a bentwood laminate.

With regard to the bentwood laminate and with regard to the moulding these objects are achieved with the features disclosed herein. Advantageous further developments of the invention are specified in the subordinate claims. All combinations of at least two of the features disclosed in the description, the claims, and/or the figures fall within the framework of the invention.

The concept underlying the invention is that of forming at least one of the two of the outer timber layers, arranged on the parallel surface sides of the in particular one intermediate layer forming a central layer, from peeled, i.e. rotary cut, balsawood veneer, and by this means to obtain a bentwood laminate that overcomes the disadvantages of the prior art. Particularly preferred is a form of embodiment in which both outer timber layers are formed from peeled balsawood veneer, which is obtained by the peeling of round timber. Here the balsa tree trunk, preferably without pre-treatment, i.e. round timber wet or moist from the forest, or alternatively pre-treated by means of steaming or heating in a water bath, is rotated relative to a peeling blade, wherein a counter-pressure is preferably generated in a suitable manner on the side facing away from the peeling blade. Here in accordance with the invention the timber veneer has, in particular sickle-shaped peeling cracks, i.e. lathe checks, (in particular, hairline cracks), originating from the peeling process; these occur during the peeling process on the side facing towards the peeling blade, mainly with regular spacings, as a result of the bending stress applied to the veneer sheet.

As stated, it is particularly preferable if the balsawood veneer that is deployed takes the form of peeled timber veneer, alternatively of sliced timber veneer, which has peeling cracks on the side facing towards the blade during its manufacture, wherein at least one of the outer timber layers, in particular, both outer timber layers, are arranged such that the peeling cracks are facing away from the intermediate layer and thus also from the opposing outer timber layer, i.e. they are provided on an outer surface. Such an arrangement of the outer timber layer, on what is during a bending process an inner bentwood laminate surface, enables a good compression of the timber in the gap regions, as a result of which small bending radii are supported. An arrangement of the peeling cracks on the outer surface of, what is after a bending process, an outer bentwood laminate side, enables the gap regions to bend open without any damage, since in this case the peeling crack cross-section is increased during the bending process. The overall result is that peeling cracks arranged in this manner increase the flexibility, i.e. the uniform mouldability of the inventive bentwood laminate, even, in particular, in the case of thick bentwood laminate designs with a thickness of more than 12 mm or 16 mm. For the case in which an outer timber layer with peeling cracks is provided on both sides of the intermediate layer, it is preferable if the peeling cracks of the two sides run in a common direction, i.e. they are aligned parallel to one another.

The use of at least one outer timber layer of peeled balsawood veneer, in particular of two outer timber layers of peeled balsawood veneer, leads to a bentwood laminate with completely new possible options. Thus the at least one outer timber layer formed from a peeled balsawood veneer can be designed to be comparatively thick, since balsawood, by virtue of its particular properties, in particular by virtue of its low density and good bending properties, is eminently suitable for the manufacture of such thick timber veneers (sheet veneers). Furthermore, a bentwood laminate in accordance with the invention can eminently be further processed into a moulding, since during the bending process the restoring forces that arise are significantly lower than is the case for bendable plywoods of known art. Moreover, peeled balsawood veneer, in particular if this has the peeling cracks referred to above, is particularly flexible and can be curved with very small bending radii. Since the bentwood laminate, by virtue of the deployment of at least one outer timber layer formed from peeled balsawood veneer, can now have a comparatively large thickness, it is no longer necessary to bond a plurality of bentwood laminates together with adhesive, having in each case an intermediate layer and two outer timber layers, in order to obtain a sufficiently thick core layer for a curved moulding, with the therewith associated disadvantages; instead the curved moulding preferably comprises in its thickness direction only a single bendable laminate in accordance with the invention, which is provided on at least one side, in particular on both sides, in each case with a covering layer, in particular comparatively rigid, i.e. acting in a stiffening manner, (and which furthermore is preferably decorative).

A further advantage of a bentwood laminate designed in accordance with the concept of the invention, or a moulding manufactured from the latter, consists in its good heat insulating properties, by virtue of the deployment of at least one peeled balsawood veneer layer.

Particularly advantageous is a form of embodiment in which the intermediate layer is thinner than the two outer layers of peeled balsawood veneer, in order to obtain optimal bending properties by this means.

Very particularly preferred is a form of embodiment of the inventive bentwood laminate, in which, in addition to the intermediate layer and the two outer timber layers, preferably formed in each case from peeled balsawood veneer, no other layers, in particular no other timber layers, are present (apart from any adhesive layers between the intermediate layer and the outer timber layers that may, if necessary, be provided, as will be described later). With regard to the design of the intermediate layer there are various possible options, as will be described later. In accordance with a first alternative the intermediate layer takes the form of a layer other than an adhesive layer, in particular other than an adhesive film, for example, a timber layer or a metal layer, wherein by the selection of the intermediate layer the bending properties of the bentwood laminate can be influenced, and/or other functionalities can be enabled. In accordance with a second alternative form of embodiment the intermediate layer takes the form of an adhesive layer, which in particular bonds the two outer timber layers directly with one another. In particular the said intermediate layer can in this case be designed as an adhesive film, in particular as a thermoplastic plastic film. In the second variant it is preferable if no other layers are provided in addition to the, in particular single, adhesive intermediate layer and the two outer timber layers, wherein this is possible in principle in both the above-cited alternatives, for example by locating another pliable layer, in particular a (further) timber layer, particularly preferably a peeled balsawood veneer layer, externally on at least one of the two outer timber layers, which layer can in particular be bonded by means of adhesive with the corresponding outer timber layer.

In order to influence the bending properties in a targeted manner, in a development of the invention provision is advantageously made for indentations, in particular incisions or perforations, to be provided on at least one of the two outer timber layers, in particular on both outer timber layers; these can, for example, be provided in a targeted manner with the aid of slitting blades or by stamping, in that these open up the peeled balsawood veneer, i.e. make it (more) pliable. Depending upon the number and alignment of the indentations, in particular slits, it can also be possible to provide the peeling cracks of the first and/or second outer timber layer on a side of the outer timber layer facing towards the intermediate layer, in particular, if the above-cited indentations are arranged on a surface side of the respective outer timber layer facing away from the intermediate layer. The indentations, in particular incisions, of an outer timber layer, are preferably oriented approximately parallel to one another, wherein it is particularly preferable if these are arranged parallel to the peeling cracks of the same outer timber layer, and/or parallel to any indentations of the opposing outer timber layer. Also conceivable, however, is an angled arrangement of the indentations, in particular incisions, relative to the peeling cracks of the respective outer timber layer, wherein it is preferable if the indentations of an outer timber layer are arranged, i.e. aligned, parallel to indentations of the opposing outer timber layer, and/or parallel to the peeling cracks of the opposing outer timber layer.

For the case in which the intermediate layer is designed as a directional layer, e.g. as a timber layer, it is preferable if the material direction, in particular the timber fibres, i.e. wood grain, runs at an angle, in particular at right-angles, to the longitudinal extent of the peeling cracks, and thus to the fibre direction of the first or second outer timber layer, and/or at an angle, in particular at right-angles, to any indentations, in particular incisions, that may be provided in at least one of the outer timber layers.

It is particularly purposeful if the first and/or second outer timber layer, formed from a balsawood veneer, has a layer thickness of more than 3 mm, preferably of more than 4 mm, further preferably of more than 6 mm, even more preferably of more than 8 mm, very particularly preferably of more than 10 mm. The layer thickness is preferably selected from a range of values of between some 3.5 mm and some 12 mm, or higher The intermediate layer preferably has a thickness from a range of values of between 0.5 mm and 5 mm, preferably of between 0.5 mm and 4 mm.

It is very particularly preferable if the distance between the outer surface of the first timber layer and the outer surface of the second timber layer amounts to at least 8 mm, preferably at least 10 mm, very particularly preferably at least 14 mm, even more preferably at least 16 mm. Particularly preferably this distance is selected from a range of values of between 8 mm and 25 mm, in particular of between 18 mm and 30 mm. It is particularly advantageous if the above-described distance corresponds to the total thickness of the bentwood laminate, even more preferably in the case of a three-layer structure, comprising the intermediate layer and two outer timber layers, if necessary with adhesive layers provided in between.

With regard to the particular design of the bentwood laminate there are various possible options. Thus in principle an asymmetric structure is possible, in which the two outer timber layers have different thicknesses. However, a symmetrical structure is particularly preferable, in which the intermediate layer forms an axis of symmetry, wherein it is very particularly preferable if a neutral fibre, i.e. neutral axis, of the bentwood laminate runs, in particular centrally, in the intermediate layer.

With regard to the selection of the material for the intermediate layer there are likewise various possible options. Thus this can consist of a flexible timber veneer, or can include such a timber veneer, for example, a balsawood veneer. Also it is conceivable, additionally, or preferably alternatively, to a timber veneer to provide a textile material, in particular a woven material or a mat, or an elastic or thermoplastic plastic layer, for example a plastic film, or alternatively a metallic foil or sheet. The intermediate layer should be distinguished by good elastic, or preferably plastic, mouldability (pliability). The material of the intermediate layer, which as stated in the introduction can consist of an adhesive layer, is preferably selected such that by this means the properties of the bentwood laminate and/or additional functionality is/are influenced in a targeted manner. Thus the intermediate layer can take the form of an electrically conductive layer, in particular, as stated, of a metal layer, or a layer having at least one conductive track, preferably a plurality of conductive tracks, for purposes of conducting electrical energy and/or electrical signals. It is also possible to design the intermediate layer as an information-carrying layer, in particular, if the intermediate layer can be magnetised in at least some sections, and in this manner can be and/or is provided with data. It is also possible to provide memory chips and/or logic units in the intermediate layer, and/or to embed them in the latter. The intermediate layer can also be designed as a moisture barrier, in particular when configured from plastic and/or metal. Likewise the intermediate layer, depending upon the choice of material, can have reinforcement properties.

It is preferable if the outer timber layers within certain limits are flexibly bonded with the intermediate layer, which can be achieved by the choice of a suitable adhesive. The adhesive should be distinguished by the fact that it does not fracture in the event of maximum deflection; this is important for the uniform deformation of the bentwood laminate, and also for the final stability of the curved moulding that results from this process. Particularly good results have been experienced with a foaming 1-component polyurethane adhesive. At the same time the use of a foaming adhesive has the advantage that any fluctuations in the thickness as a result of a comparatively rough veneer surface are evened out, and thus full surface bonding is ensured. Other adhesives that fulfil the above-cited conditions can likewise be deployed. As an alternative to a foaming adhesive, in particular in the case of comparatively smooth surfaces, non-foaming adhesives can also be deployed, in particular also a thermoplastic film, which softens with heating.

Very particularly preferred is an inner bending radius from a range of values of between 120 mm and 300 mm, preferably of between 100 mm and 250 mm, preferentially of between 80 mm and 200 mm, even more preferentially of between 40 mm and 180 mm.

Particularly good bending results ensue, at the same time with a low total weight for the bentwood laminate and subsequently also for any moulding manufactured from the latter, if the density of the first and/or second outer timber layer, measured with a residual moisture content of 12% by weight with respect to the timber weight, amounts to less than 200 kg/m$^3$, and is preferably selected from a range of values of between 80 kg/m$^3$ and 165 kg/m$^3$.

The invention also leads onto a curved moulding, in particular for an item of furniture, or an item of cladding, in particular as a shell item, comprising a curved bentwood laminate, in particular in its thickness direction a single curved, bentwood laminate, which is designed in accordance with the concept of the invention. This preferably takes the form of a bentwood laminate with a symmetrical structure, consisting of (preferably exclusively) two outer timber layers of peeled balsawood veneer and an intermediate layer located in between them. The latter can, as stated in the introduction, be designed as an adhesive layer or as a layer other than an adhesive layer, wherein in the latter case, the said intermediate layer is then preferably bonded with an outer timber layer, in each case with one adhesive layer. The curved moulding is further distinguished by the fact that, on the outer surface of the first outer timber layer and/or on the outer surface of the second timber layer, a preferably decorative covering layer is provided, which even more preferably stiffens the curved moulding. In a very particularly preferred manner the bentwood laminate designed in accordance with the concept of the invention forms a core layer structure, which on both surface sides is surrounded by at least one, in particular exclusively one, covering layer, which preferably is bonded with adhesive with the adjacent outer timber layer in each case.

As covering layers are in particular deployed: hardwood fibreboard, hard fibreboard, medium density fibreboard, plywood, timber veneer, high-pressure laminate (HPL), fibre composite material, fibre composite plastic (FCP), fibre-reinforced plastic (FRP).

As stated, a further advantage of balsawood veneer is its very good deformability and its ability to adapt uniformly to the smallest bending radii. The material composite obtained has a small restoring force by virtue of the good deformability of the balsawood veneer, and additionally by virtue of the lower number of layers when compared with the prior art, as a result of which in mouldings it is not necessary to bond a plurality of bentwood laminates with adhesive over their surfaces with one another.

It is very particularly preferable if the curved moulding in at least one section has an S-shaped curved form.

BRIEF DESCRIPTION OF THE DRAWINGS

Further advantages, features, and details of the invention ensue from the following description of preferred examples of embodiment, together with the aid of the drawings.

Here, one sees that.

In the figures the same elements, and elements with the same function, are identified with the same reference symbol.

DETAILED DESCRIPTION

Figure 1:
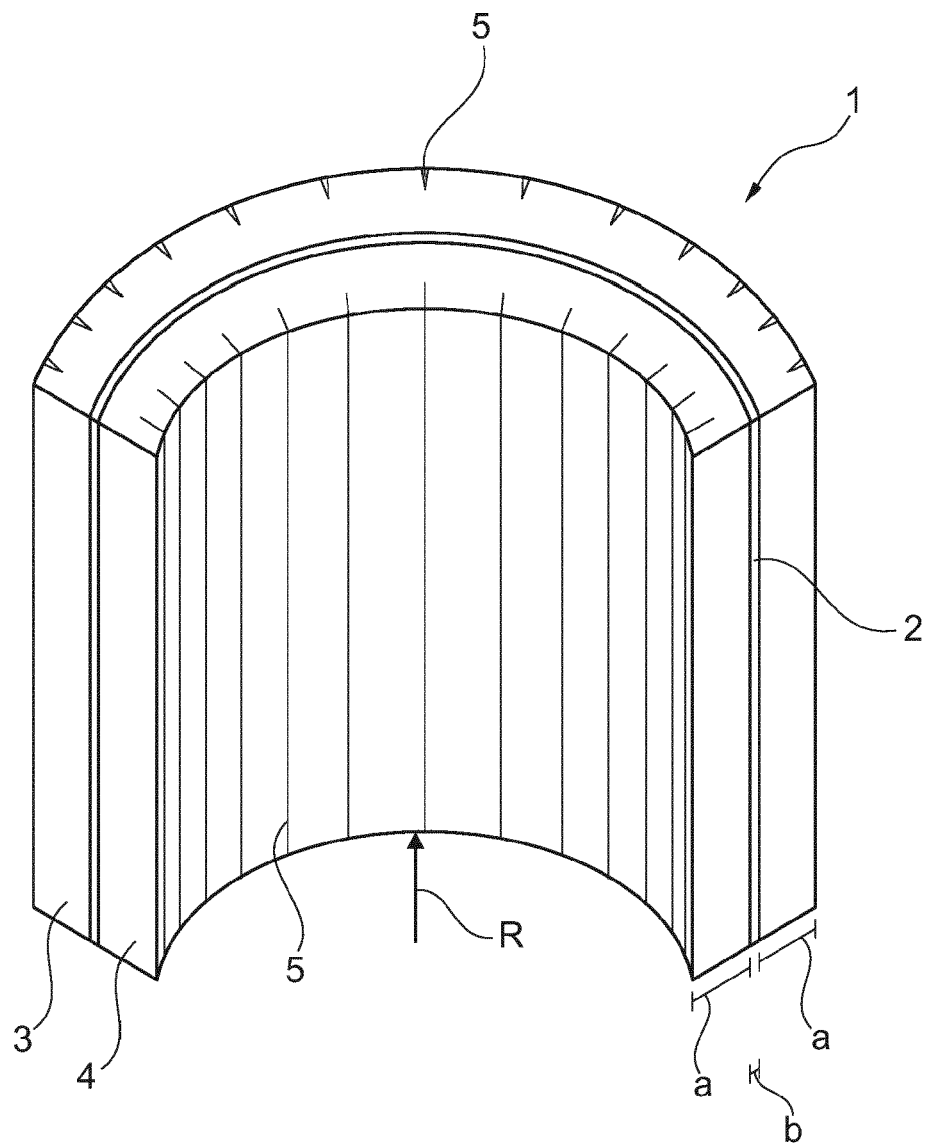
FIG. 1: shows a bentwood laminate that is already curved.

FIG. 1 shows a symmetrically constructed bentwood laminate 1, comprising three surface elements bonded with one another with adhesive. Here this takes the form on the one hand of a central intermediate layer 2, forming an axis of symmetry and accommodating centrally a neutral fibre, i.e. neutral axis, made from a flexible substrate, for example, a timber veneer, a plastic film, a woven material, or metal. On each surface side of the intermediate layer 2 is located an outer timber layer 3, 4, wherein the reference symbol 3 identifies in an exemplary manner a first outer timber layer formed as a peeled, i.e. rotary cut, balsawood veneer, and the reference symbol 4 likewise identifies an outer timber layer formed as a peeled balsawood veneer.

The two outer timber layers 3, 4 are in each case bonded with the intermediate layer 2 by means of an adhesive layer that is not indicated.

It can be discerned that both outer timber layers 3, 4 have so-called peeling cracks, i.e. lathe checks, 5 on an outer surface; these are caused by the manufacturing process, and arise during the production of the timber veneer, in particular on the side facing towards the peeling blade.

Particularly preferred is the arrangement represented, in which the peeling cracks of both outer timber layers 3, 4 have the same orientation, and are located on the respective outer surfaces, i.e. on surfaces facing away from the intermediate layer 2, so that the initially unbent, i.e. plane surface, bentwood laminate is pliable about a virtual axis of bending, which runs parallel to the longitudinal extent of the peeling cracks 5.

In the course of this bending process a compression of the balsawood of the inner bending layer of the second outer timber layer 4 takes place in the example of embodiment shown, which is optimally enabled by means of the peeling cracks 5. At the same time the peeling cracks 5 of the outer bending layer, i.e. in the example of embodiment shown the first outer timber layer 3, are stretched, i.e. widened, as a result of which an optimal pliability results in combination. In the example of embodiment shown only an inner bending radius R is indicated. For the outer bending radius the identifying arrow should be extended up to the outer surface of the first outer timber layer 3.

For the case in which the intermediate layer 2 takes the form of a timber layer, for example, a balsawood veneer layer, it is preferable if the fibre orientation of the intermediate layer 2 and/or any peeling cracks that may be provided, run at an angle, e.g. at right-angles, to the peeling cracks of the outer timber layers 3, 4.

Figure 2:
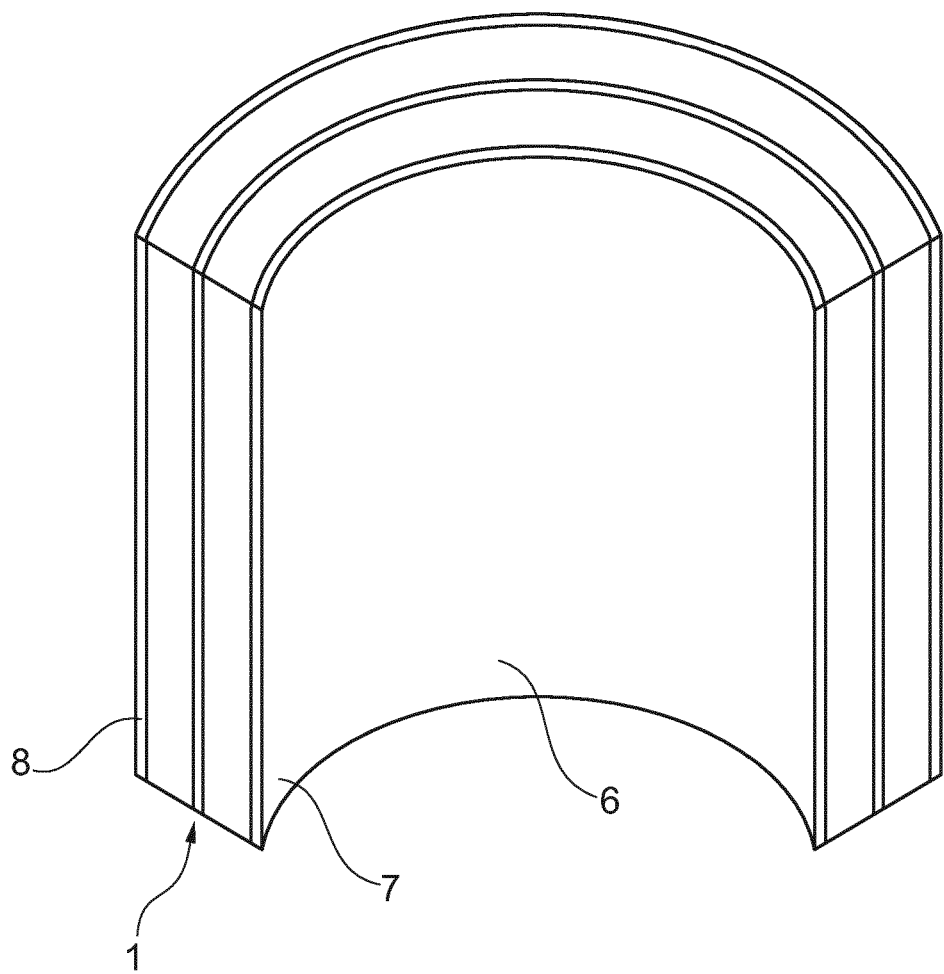
FIG. 2: shows a curved moulding manufactured from a bentwood laminate in accordance with FIG. 1.

A bentwood, represented in an exemplary manner in FIG. 1, after manufacture in a press initially plane, i.e. not curved, which by the application of force can be translated into the curved shape represented in FIG. 1, is eminently suitable for the purpose of manufacturing a curved moulding 6 shown in an exemplary manner in FIG. 2, in which the bentwood laminate 1 forms a core layer arrangement (central arrangement), which is accommodated between two covering layers 7, 8. The bonding of the bentwood 1 and the covering layers 7, 8 is preferably undertaken between two moulding plates, wherein the inner moulding plate fits against a first surface side, and the second moulding plate fits against a second surface side. Thus, for example, a mould and a countermould are deployed, to which a forming pressure is applied in order to optimise the process of adhesion. Alternatively the layered structure is bonded with adhesive, placed in a mould, and subjected, for example, to a reduced pressure in a vacuum bag. Here the covering layers 7, 8 are preferably bonded with adhesive to the bentwood laminate 1. It should be noted that the moulding 6 has a single bentwood laminate 1 in its thickness direction, which is preferred. In other words it is not necessary for a plurality of bentwood laminates to be laminated together, as is the case in the prior art, in order to achieve the desired total thickness of the moulding 6. In the interests of clarity the peeling cracks of the bentwood laminate 1 are not indicated in the representation in FIG. 2.

In the example of embodiment shown the thickness a of the two outer timber layers 3, 4 is 10 mm in each case. The intermediate layer 2 has a thickness b of, for example, 1 mm. From this a total thickness of the bentwood laminate 1 of 21 mm ensues, plus the thin adhesive layers with an average thickness of preferably less than 1 mm, in particular of between 0.1 mm and 0.5 mm.

The invention claimed is:

1. A pliable bentwood laminate with an intermediate layer (2), forming a central layer, having a first and a second surface side, wherein on the first surface side a first outer timber layer (3) is provided, and on the second surface side a second outer timber layer (4) is provided, wherein the distance between the outer surface of the first outer timber layer (3) and the outer surface of the second outer timber layer (4) amounts to at least 8 mm, wherein the first and second outer timber layers (3, 4) are formed from rotary cut balsawood veneer, and wherein the density of the first and second outer timber layers (3, 4), with a residual moisture content of 12% by weight with respect to the timber mass, amounts to less than 200 kg/m$^3$, and wherein the first and second outer timber layers (3,4) have lathe checks (5) on one surface side,
wherein,
the first and second outer timber layers (3, 4) are arranged such that the surface side having the lathe checks (5) is facing away from the intermediate layer (2) and wherein, the bentwood laminate can be curved and/or is curved with an inner bending radius from a range of values of between 100 mm and 250 mm, and wherein, the intermediate layer is designed as a directional timber layer, and wherein, a neutral axis of the bentwood laminate runs in the intermediate layer, and wherein, wood grain of the directional intermediate layer runs at right-angles to the longitudinal extent of the lathe checks of the first and second outer timber layers (3, 4).

2. The bentwood laminate in accordance with claim 1, wherein, the intermediate layer (2) has a lesser thickness than the first and second outer timber layers (3, 4).

3. The bentwood laminate in accordance with claim 1, wherein the first and/or second outer timber layer (3, 4) has on one surface side indentations, manufactured by means of a slitting blade, for purposes of influencing the bending properties.

4. The bentwood laminate in accordance claim 1, wherein the first and/or the second outer timber layer (3, 4) have a layer thickness of more than 3 mm.

5. The bentwood laminate in accordance with claim 4, wherein the layer thickness is more than 6 mm.

6. The bentwood laminate in accordance with claim 4, wherein the layer thickness is more than 8 mm.

7. The bentwood laminate in accordance with claim 4, wherein the layer thickness is between 3.5 mm and 12 mm.

8. The bentwood laminate in accordance with claim 4, wherein the layer thickness is between 8 mm and 14 mm.

9. The bentwood laminate in accordance with claim 1, wherein the distance between the outer surface of the first outer timber layer and the outer surface of the second outer timber layer, which corresponds to the total thickness of the bentwood laminate (1), amounts to at least 10 mm.

10. The bentwood laminate in accordance with claim 9, wherein the distance is at least 16 mm.

11. The bentwood laminate in accordance with claim 9, wherein the distance is between 18 mm and 30 mm.

12. The bentwood laminate in accordance with claim 1, wherein the intermediate layer (2) has a thickness from a range of values of between 0.3 mm and 5 mm.

13. The bentwood laminate in accordance with claim 1, wherein between the intermediate layer (2) and the outer timber layers (3, 4) in each case an adhesive layer is provided.

14. The bentwood laminate in accordance with claim 1, wherein the bentwood laminate can be curved and/or is curved with an inner bending radius from a range of values of between 40 mm and 180 mm.

15. The bentwood laminate in accordance claim 1, wherein the density of the first and/or second outer timber layer (3, 4), with a residual moisture content of 12% by weight with respect to the timber mass, is selected from a range of values of between 80 kg/m$^3$ and 165 kg/m$^3$.

16. The bentwood laminate in accordance with claim 1, wherein the laminate consists of the two outer timber layers (3, 4) and the intermediate layer (2) with adhesive layers arranged in between.

17. A curved moulding, for an item of furniture or a shell-shaped item of cladding, comprising a single, curved bentwood laminate (1), in accordance with claim 1, wherein on the outer surface of the first and/or second outer timber layer (3, 4) a decorative, covering layer (7, 8) is provided.

18. The moulding in accordance with claim 17, wherein the covering layer (7, 8) is designed and arranged in a manner stiffening the moulding.

19. The moulding in accordance with claim 17, wherein the covering layer (7, 8) comprises or is formed from a material of the group: hardwood fibreboard, hard fibreboard, medium density fibreboard, timber veneer, plywood, high-pressure laminate (HPL), fibre composite material, fibre-reinforced plastic (FRP).

* * * * *